(12) United States Patent
Frisken (10) Patent No.: US 6,466,704 B1
(45) Date of Patent: Oct. 15, 2002

(54) OPTICAL FILTERING METHOD AND DEVICE

(75) Inventor: Steven James Frisken, Randwick (AU)

(73) Assignee: Nortel Networks (Photonics) PTY Ltd., Eveleigh (AU)

( * ) Notice: Subject to any disclaimer, the term of this patent is extended or adjusted under 35 U.S.C. 154(b) by 0 days.

(21) Appl. No.: 09/660,147

(22) Filed: Sep. 13, 2000

(51) Int. Cl.[7] .............................. G02B 6/00; H04J 14/06
(52) U.S. Cl. .............................. 385/11; 385/31; 385/33; 385/39; 385/47; 385/140; 359/115; 359/122
(58) Field of Search .............................. 385/1, 2, 3, 11, 385/8, 9, 14, 15, 18, 24, 27, 28–31, 33, 36–39, 47, 49, 140; 359/115, 124, 122

(56) References Cited

U.S. PATENT DOCUMENTS

| | | | |
|---|---|---|---|
| 4,678,287 A | * 7/1987 | Buhrer | 385/11 X |
| 5,579,420 A | 11/1996 | Fukushima | 385/11 |
| 5,689,360 A | 11/1997 | Kurata et al. | 359/281 |
| 5,694,233 A | 12/1997 | Wu et al. | 359/117 |
| 5,724,165 A | 3/1998 | Wu | 359/117 |
| 5,867,291 A | 2/1999 | Wu et al. | 359/124 |
| 5,912,748 A | 6/1999 | Wu et al. | 359/117 |
| 5,978,116 A | 11/1999 | Wu et al. | 359/124 |
| 6,081,367 A | 6/2000 | Yokoyama et al. | 359/341 |
| 6,208,774 B1 | * 3/2001 | Sorin et al. | 385/11 |
| 6,233,372 B1 | * 5/2001 | Nakaya | 385/11 |
| 6,263,131 B1 | * 7/2001 | Frisken et al. | 385/31 |
| 6,285,500 B1 | * 9/2001 | Ranalli et al. | 359/497 |

* cited by examiner

Primary Examiner—Brian Healy
(74) Attorney, Agent, or Firm—Ladas & Parry (57) ABSTRACT

An optical filter for providing frequency dependant filtering of an optical input signal, the filter including: an input wave guide; an output waveguide; a polarisation separation means; a variable polarisation rotation means, the variation being dependant on a first control input signal; and a birefringent element having variable birefringence, the variation being dependant on a second control input signal; wherein an optical input signal emitted from the input waveguide passes through the polarisation separation means, the variable polarisation rotation means and the birefringent element to the output waveguide so as to produce at the output waveguide an optical output signal having a frequency dependant output characteristics determined by one of the control input signals.

24 Claims, 8 Drawing Sheets

OPTICAL FILTERING METHOD AND DEVICE

FIELD OF THE INVENTION

The present invention relates to filtering of optical signals and, in particular, discloses an optical filter having electronic control.

BACKGROUND OF THE INVENTION

The utilization of optical fibre transmission in telecommunications systems has become increasingly important due to their high bandwidth capabilities. Recently, Dense Wavelength Division Multiplexing (DWDM) Systems have become a popular choice as a result of their increased bandwidth possibilities.

In complex DWDM systems and in optical fibre transmission generally it is often necessary to amplify and filter signals during transmission. The degree of filtering required is often variable. This is particularly the case in the situation of filtering signals amplified using erbium doped amplifiers as the spectral dependence of amplification of an erbium doped fibre is dependant upon input conditions.

SUMMARY OF THE INVENTION

It is an object of the present invention to provide for an electronically controllable optical filter device suitable for use in telecommunications systems.

In accordance with a first aspect of the present invention, there is provided an optical filter for providing frequency dependant filtering of an optical input signal, the filter including: an input wave guide; an output waveguide; a polarisation separation means; a variable polarisation rotation means; the variation being dependant on a first control input signal; and a birefringent element having variable birefringence, the variation being dependant on a second control input signal; wherein an optical input signal emitted from the input waveguide passes through the polarisation separation means, the variable polarisation rotation means and the birefringent element to the output waveguide so as to produce at the output waveguide an optical output signal having a frequency dependant upon characteristics determined by one of the control input signals.

The frequency dependant output characteristic preferably can include an overall extinction magnitude (difference between the maximum and minimum attenuation in the bandwidth of interest) determined by the first control input signal and a frequency varying attenuation characteristic determined by the second control signal. The frequency dependant output characteristic preferably can include a oscillatory frequency response having a tuning determined by the second control input signal.

The input and output waveguide can have ends which are spaced apart at a first end of the filter and the filter further can include: a reflection element spaced at a second end of the filter such that the polarisation separation means, the variable polarisation rotation means and the birefringent element are preferably between the reflection element and the waveguides, such that light emitted from the input waveguide passes through the polarisation separation means, the variable polarisation rotation means and the birefringent element before being reflected by the reflection element so as to again pass through the birefringent element, the variable polarisation rotation means and the polarisation separation means before being emitted towards the output waveguide.

Preferably, at least one focussing means for focussing light emitted from the input waveguide towards the output waveguide is also provided.

In one embodiment, the maximum level of attenuation of light passing from the input waveguide to the output waveguide at any particular frequency can be determined by variation of the first control input signal, and the frequency of the maximum level of attenuation can be determined by variation of the second control input signal.

The variable birefringence can be provided by thermal variation of the birefringent element in proportion with the level of the second control input signal. The thermal variation can be provided by a Peltier device attached to the birefringent element. Alternatively, the variable birefringence can be provided by an electro-optic element.

The variable polarisation rotation means can comprise a Faraday rotator providing a rotation in accordance with an applied magnetic field and the filter can be formed between the poles of an electromagnet poles including an aperture through which the device passes. The external magnetic field can be provided by an initial permanent magnet providing a magnetic field having tangential and perpendicular components to a face of the Faraday rotator, and a second electromagnet having a magnetic field substantially perpendicular to the face of the Faraday rotator.

In accordance with a further aspect of the present invention, there is provided a method of filtering an optical input signal in a frequency dependant manner, the method comprising the steps of: (a) separating substantially orthogonal polarisation states; (b) imparting a wavelength dependant polarisation transformation function to at least one of the polarisation states; (c) combining the outputs of the step (b) to produce a substantially polarisation independent frequency dependant filter response. The step (a) can comprise spatially separating orthogonal polarisation states.

In accordance with a further aspect of the present invention, there is provided a method of filtering an optical input signal in a frequency dependant manner, the method comprising the steps of: (a) emitting the light from a first optical waveguide; (b) substantially separating orthogonal polarisation states emitted from the first optical waveguide; (c) rotating the separated orthogonal polarisation states in a first direction; (d) for polarisation states having a predetermined angular profile, delaying one orthogonal polarisation state relative to a second so as to produce optical frequency dependant polarisation states; (e) rotating the delayed polarisation states in a second direction to produce rotated delayed polarisation states; and (f) for predetermined angular profiles, translating one polarisation state with respect to a second so as to combine the polarisation states having predetermined angular profiles at an output waveguide wherein light emitted from the input optical waveguide is attenuated in a frequency dependant manner.

The step (c) can comprise rotating the polarisation states to a degree as determined by a first input control signal. The step (d) can comprise delaying one orthogonal polarisation state relative to a second by an amount as determined by a second input control signal. The frequency dependant filtering characteristics are preferably determined by the first and second input signal.

In accordance with a further aspect of the present invention, there is provided an optical amplifier including an amplifying element and an optical equaliser comprising a plurality of concatenated optical filter elements each having frequency dependant attenuation characteristics which can be dynamically frequency and extinction tuned in order to optimise the optical equalisation of an optical signal transmitted by the optical amplifier, at least one of the optical filter elements including an input wave guide; an output waveguide; a polarisation separation means; a variable polarisation rotation means, the variation being dependant on a first control input signal; and a birefringent element having variable birefringence, the variation being dependant on a second control input signal; wherein an optical input signal emitted from the input waveguide passes through the polarisation separation means, the variable polarisation rotation means and the birefringent element to the output waveguide so as to produce at the output waveguide an optical output signal having a frequency dependant output characteristics determined by one of the control input signals.

In accordance with a further aspect of the present invention, there is provided an optical communications system including an optical element further including an amplifying element and an optical equaliser comprising a plurality of concatenated optical filter elements each having frequency dependant extinction which can be dynamically frequency and overall attenuation tuned in order to optimise the optical equalisation of an optical signal transmitted by the optical element, at least one of the optical elements including an input wave guide; an output waveguide; a polarisation separation means; a variable polarisation rotation means, the variation being dependant on a first control input signal; and a birefringent element having variable birefringence, the variation being dependant on a second control input signal; wherein an optical input signal emitted from the input waveguide passes through the polarisation separation means, the variable polarisation rotation means and the birefringent element to the output waveguide so as to produce at the output waveguide an optical output signal having a frequency dependant output characteristics determined by one of the control input signals.

In accordance with a further aspect of the present invention, there is provided an optical attenuation filter including: an input an output wave guide having ends spaced apart at a first end of the filter, a polarisation separation means for spatially separating polarisation states emitted from the input waveguide; a variable polarisation rotation means, the variation being dependant on a first control input signal; and reflection means for reflecting light emitted from the input waveguide towards the output waveguide; wherein an optical input signal emitted from the input waveguide passes through the polarisation separation means, the variable polarisation rotation means, is reflected by the reflection means back through the variable polarisation means and the polarisation separation means towards the output waveguide so as to produce at the output waveguide an optical output signal having a polarisation independent extinction determined by first control input signal.

In accordance with a further aspect of the present invention, there is provided an optical filter including a variable polarisation rotation means comprising a Faraday rotator providing a rotation in accordance with an applied magnetic field and the filter is formed between the poles of an electromagnet with one of the poles including an aperture through which the input and output waveguide passes.

BRIEF DESCRIPTION OF THE DRAWINGS

Notwithstanding any other forms which may fall within the scope of the present invention, preferred forms of the invention will now be described, by way of example only, with reference to the accompanying drawings in which.

DETAILED DESCRIPTION OF THE EMBODIMENTS

Figure 1:
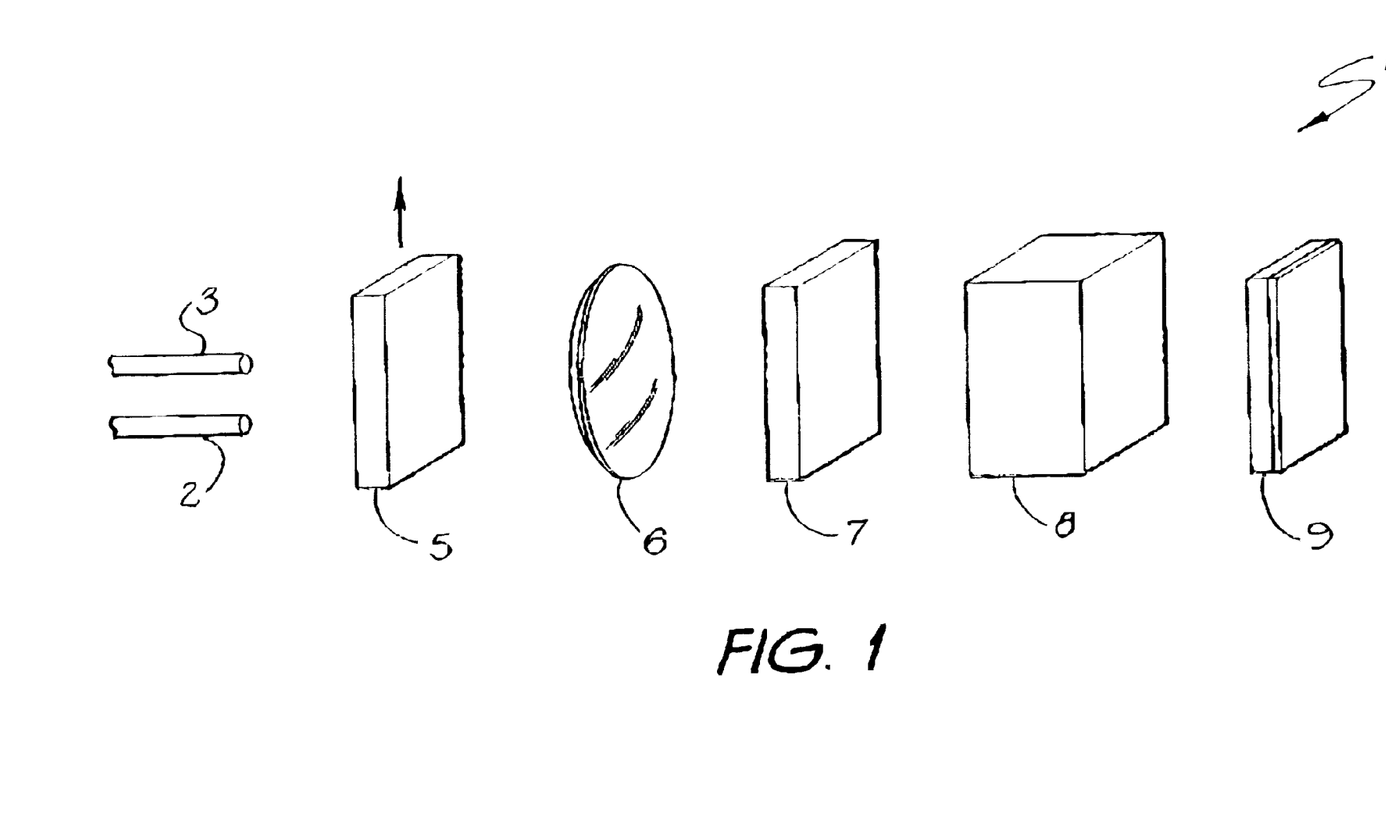
FIG. 1 illustrates a simplified exploded perspective of the preferred embodiment.

The preferred embodiment comprises an electronically controllable optical filter device. Turning initially to FIG. 1, there is illustrated an exploded perspective (in schematic form) of the filtering device 1. The filtering device includes input/output optical fibre waveguides 2, 3 with the light from input waveguide being projected through a series of elements including walkoff crystal 5, lens 6, Faraday rotator 7 and a birefringent crystal 8. The emitted light is reflected by a mirror 9 so as to return again through the elements 8 to 5.

As will become more evident hereinafter, the walkoff crystal 5 translates one of the polarisation states in the direction 10. The Faraday rotator provides a non-reciprocal rotation of the polarisation states depending on the strength of an external magnetic field (not shown). The birefringent crystal 8 provides a rotation of the polarisation state depending upon the thickness. The thickness is controlled by a thermal electric cooler (not shown), otherwise known as a Peltier device. Alternatively, a Pockel's cell can be utilised in place of the thermal electric coder which provides a variable birefringence dependent upon the strength of an external electric field.

Figure 2:
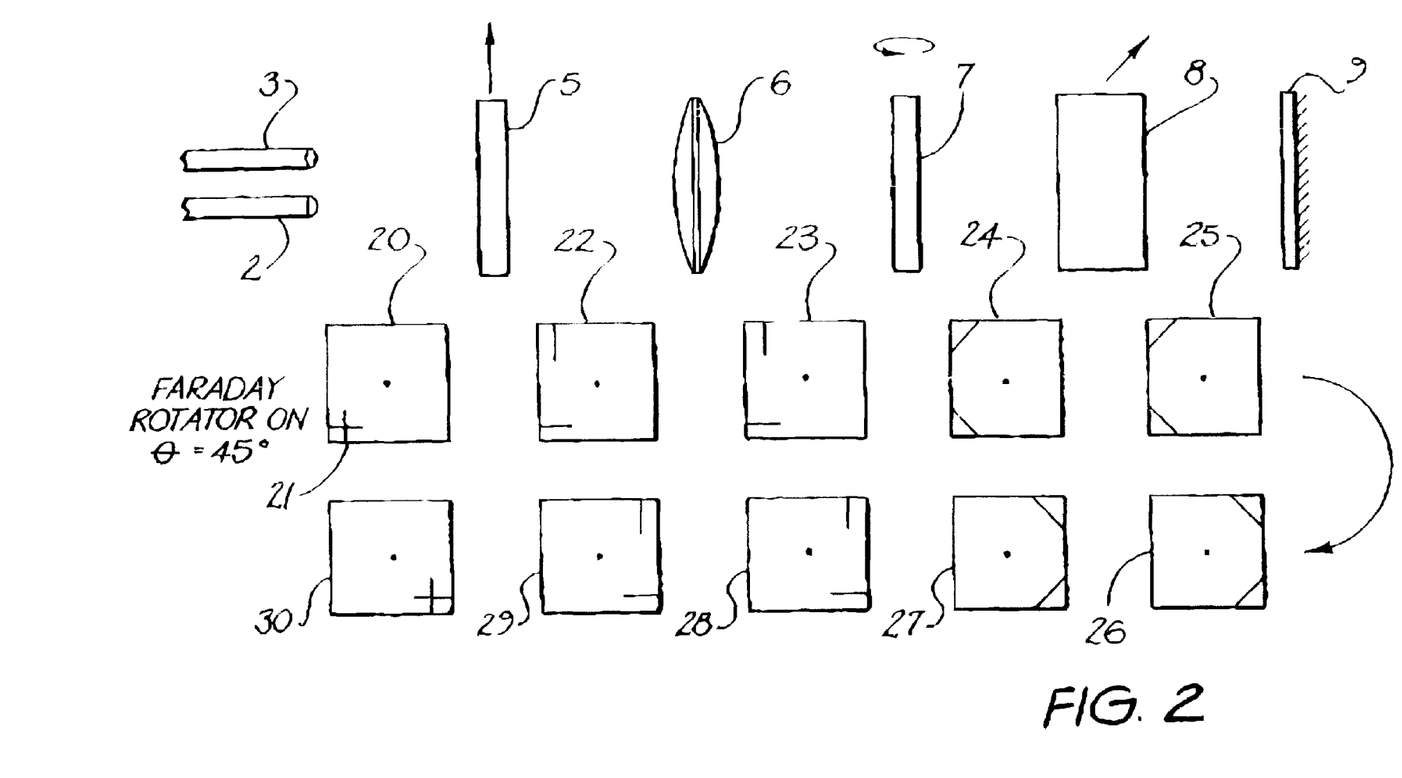
FIG. 2 illustrates a series of polarisation state transition diagrams.

Turning now to FIG. 2, there is initially illustrated a series of polarisation state diagrams eg. 20 for the arrangement of FIG. 1 when the Faraday rotator is activated so as to provide a non-reciprocal rotation of 45°. Initially, the polarisation states are spatially aligned 21. After traversing the walkoff crystal 5, one of the polarisation states is translated relative to the other so as to separate the polarisation states 22. The lens 6 acts to focus the outgoing and return beams and has no effect 23 on the polarisation state. The Faraday rotator 7 provides for a 45° rotation of each of the polarisation states. The birefringent crystal 8 is oriented at 45° and delays one orthogonal polarisation relative to the other. However, as the birefringent crystal 8 is oriented at 45°, it has no effective consequence on the polarisation states 25.

The mirror 9 inverts the polarisation states 26 before they again pass through the birefringent crystal 8 which has no effect 27. The Faraday rotator 7 provides a 45° rotation 28 of the polarisation states. The lens 6 again has no effect 29 on the polarisation states. Finally, the walkoff crystal 5 aligns the polarisation states 30 for output to the fibre 3. Hence, the net result when the Faraday rotator is providing a 45° non-reciprocal rotation is a transfer of the emitted light from the fibre 2 to fiber 3 independently of wavelength.

As noted previously, the birefringent crystal 8 delays one of the polarisation states with respect to the other. The amount of delay will be dependant upon the thickness of the birefringent crystal and the wavelength.

Figure 3:
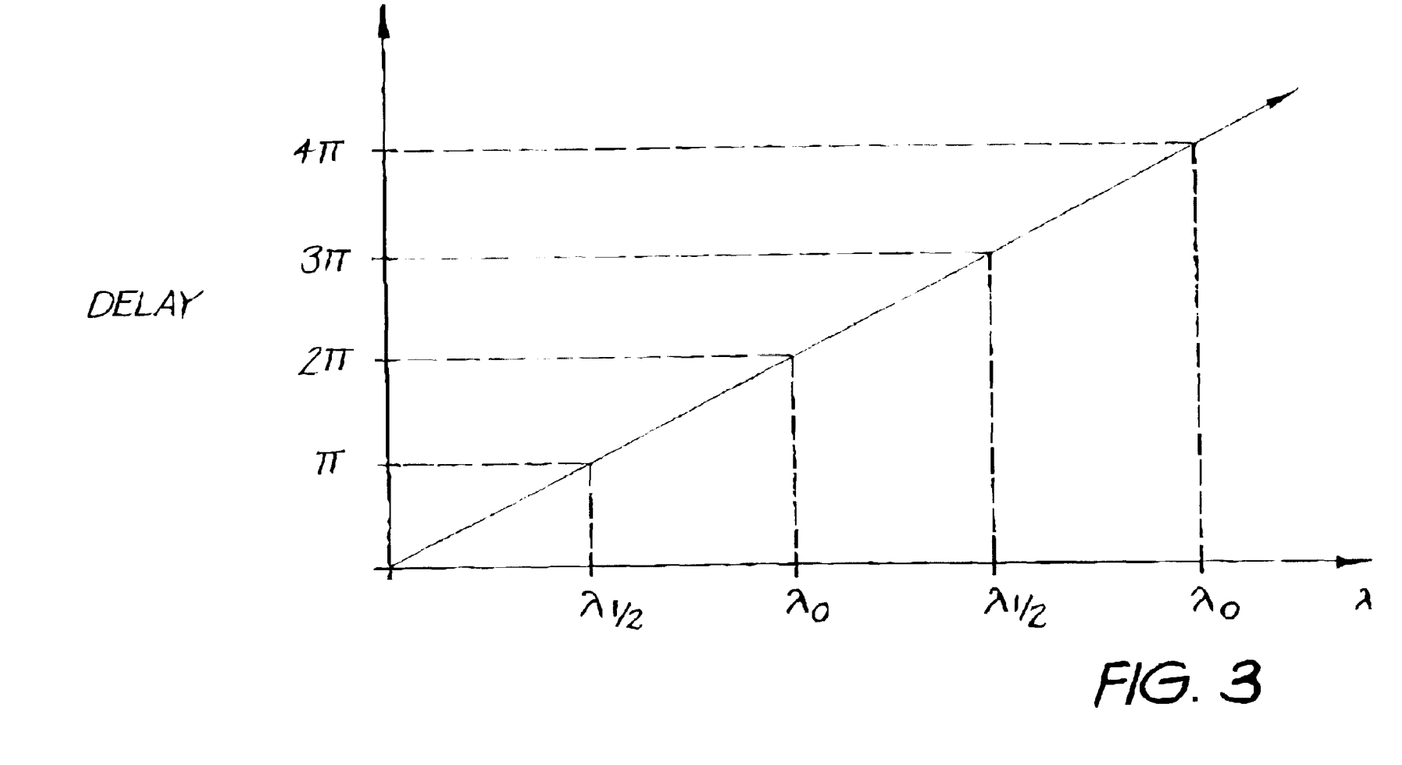
FIG. 3 illustrates the phase delay of the birefringent crystal of the preferred embodiment with respect to wavelength.

Turning now to FIG. 3, there is provided for the purpose of illustration, an example graph of the phase delay of the birefringent crystal with respect to wavelength. The arrangement of FIG. 3 is for the total phase delay in traversing the birefringent crystal in both the out and return modes.

The degree of phase delay will be somewhere between 0 and $2\pi$ as the wavelength increases. The wavelength corresponding to each $2\pi$ phase delay is denoted $\lambda_0$, with the phase delay for an "out of phase" rotation of the phase being denoted $\lambda_{1/2}$. The apparent phase delay will vary between 0 and $2\pi$ in accordance with wavelength. Further, if the properties of the birefringent crystal are changed, then the $\lambda_0$ and $\lambda_{1/2}$ points will be correspondingly varied on the wavelength scale. The variable phase delay between orthogonal polarisation states can be utilised to provide for a wavelength dependent sinusoidal extinction of an input signal.

Figure 4:
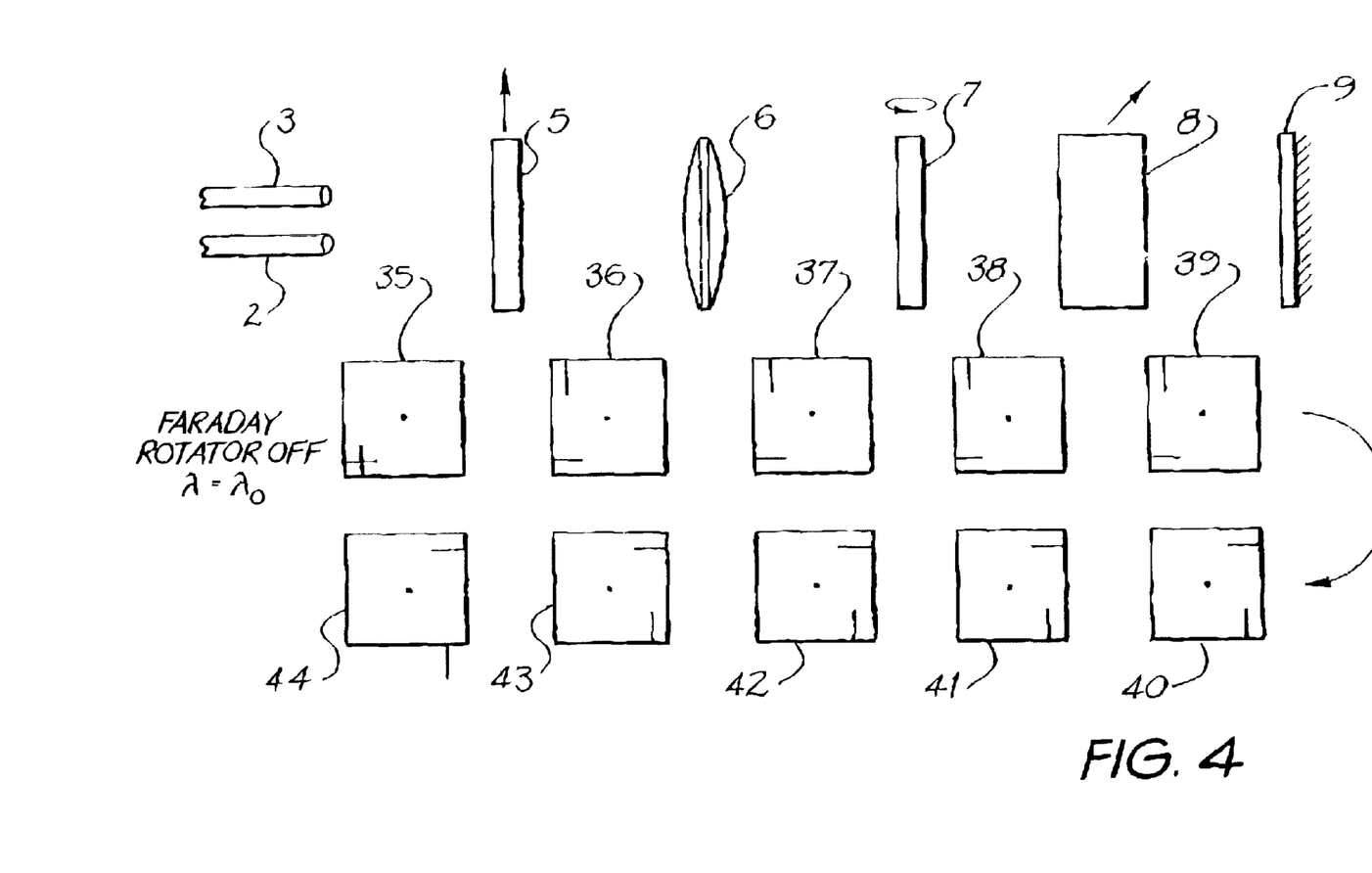
FIG. 4 illustrates a series of polarisation state transition diagrams.

Turning now to FIG. 4, there is illustrated a series of polarisation state diagrams eg. 35 for the case where the Faraday rotator is turned off and when $\lambda$ corresponds to the $\lambda_0$ state of FIG. 3.

Initially, the polarisation states are spatially aligned as they are emitted from the fibre 2. Next, the walkoff crystal 5 provides for separation 36 of the polarisation states which are unaffected 37 by the lens elements 6. The Faraday rotator 7 is turned off so it also has no effect 38 on the polarisation state.

At the position $\lambda=\lambda_0$ each traversal of the birefringent crystal 8 provides for a $\pi$ or $2\pi$ phase delay and hence, the double traversal ($2\pi$ or $4\pi$) has no effect on the polarisation state 41. Polarisation state 39 can either be unchanged ($2\pi$ phase delay) or rotated by 90° ($\pi$ phase delay). The mirror 9 reflects the polarisation states 40 where they are again delayed by the factor $\pi$ or $2\pi$ 41. The Faraday rotator 7 is turned off so it has no effect 42 on the polarisation state 42 nor does the lens 6, 43. The walkoff plate 5 further separates the polarisation states 44 such that they are no longer aligned with the fibre 3.

Hence, the overall result in the arrangement of FIG. 4 is that the device of FIG. 1 acts as an attenuator.

Figure 5:
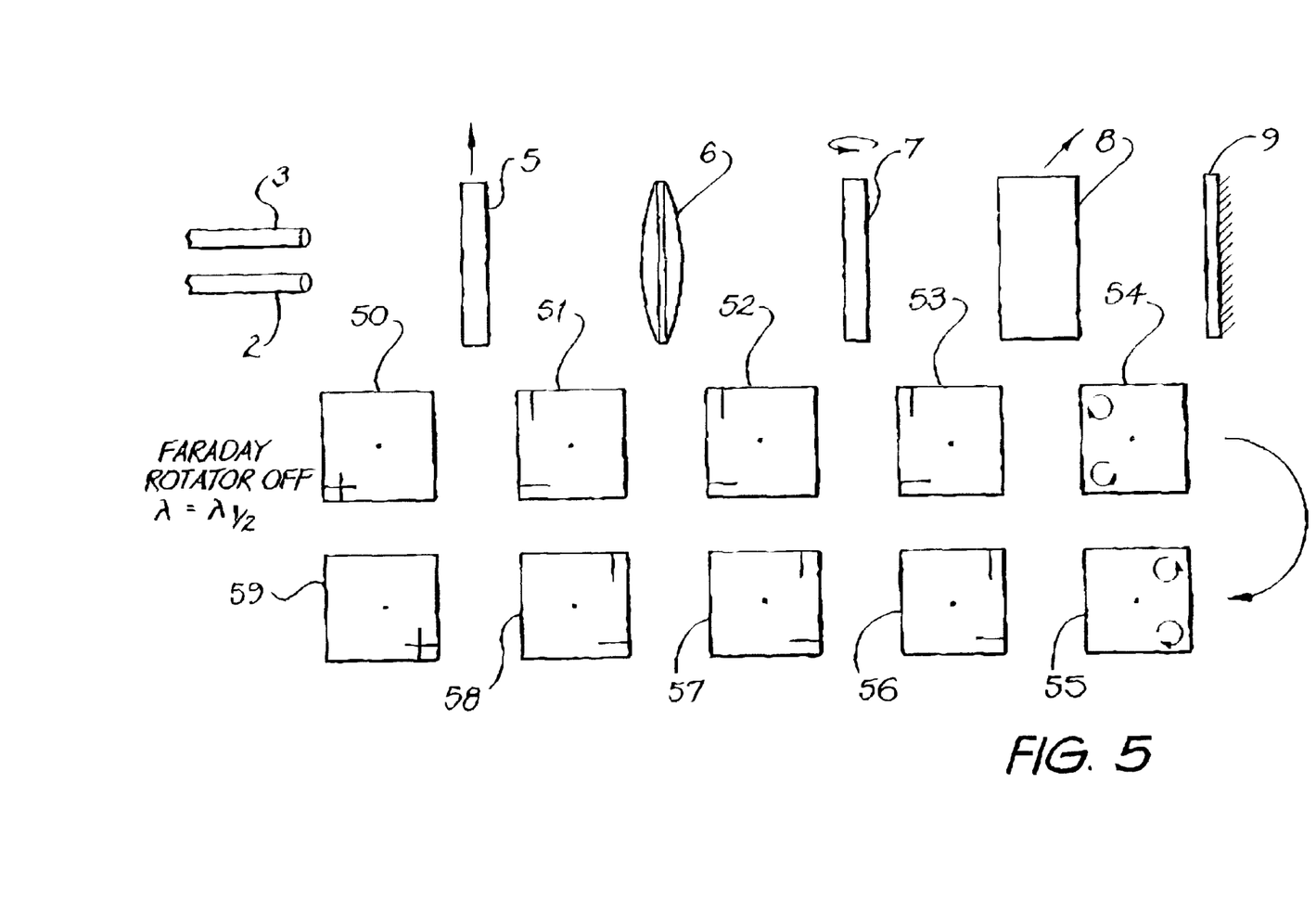
FIG. 5 also illustrates a series of polarisation state transition diagrams.

Turning now to FIG. 5, there is illustrated a series of polarisation state diagrams eg. 50 for the case where the Faraday rotator is off at the wavelength $\lambda_{1/2}$ of FIG. 3. Initially, the polarisation states 50 are aligned and they are again separated 51 by the walkoff crystal 5. The lens 6 has no effect on the polarisation state 52 and the Faraday rotator 7, which is turned off, also has no effect on the polarisation state 53. In the case where $\lambda=\lambda_{1/2}$ each traversal of the birefringent crystal 8 acts as a quarter wave plate delaying the phase of orthogonal polarisation states relative to one another. Hence, after the first traversal of the birefringent crystal 8, the polarisation state 54 will comprise two oppositely oriented elliptical polarisation modes. The mirror 9 results in an inversion 55 of the polarisation states.

The second traversal of the birefringent crystal 8 results in the output polarisation states 56 which are unaffected 57 by the Faraday rotator 7. The lens 6 again does not affect the polarisation states 58. Finally the walkoff crystal 5 aligns the polarisation states 59 where they are emitted to output fiber 3.

By examining the output polarisation states 44 and 59 of FIG. 4 and FIG. 5, it can be seen that as $\lambda$ goes from $\lambda_{1/2}$ to $\lambda_0$ and the Faraday rotator is off, the arrangement of FIG. 1 goes from acting as a full pass filter to acting as an attenuator. Further, as illustrated in FIG. 2, when the Faraday rotator is on, the device again acts as a full pass filter.

Figure 6:
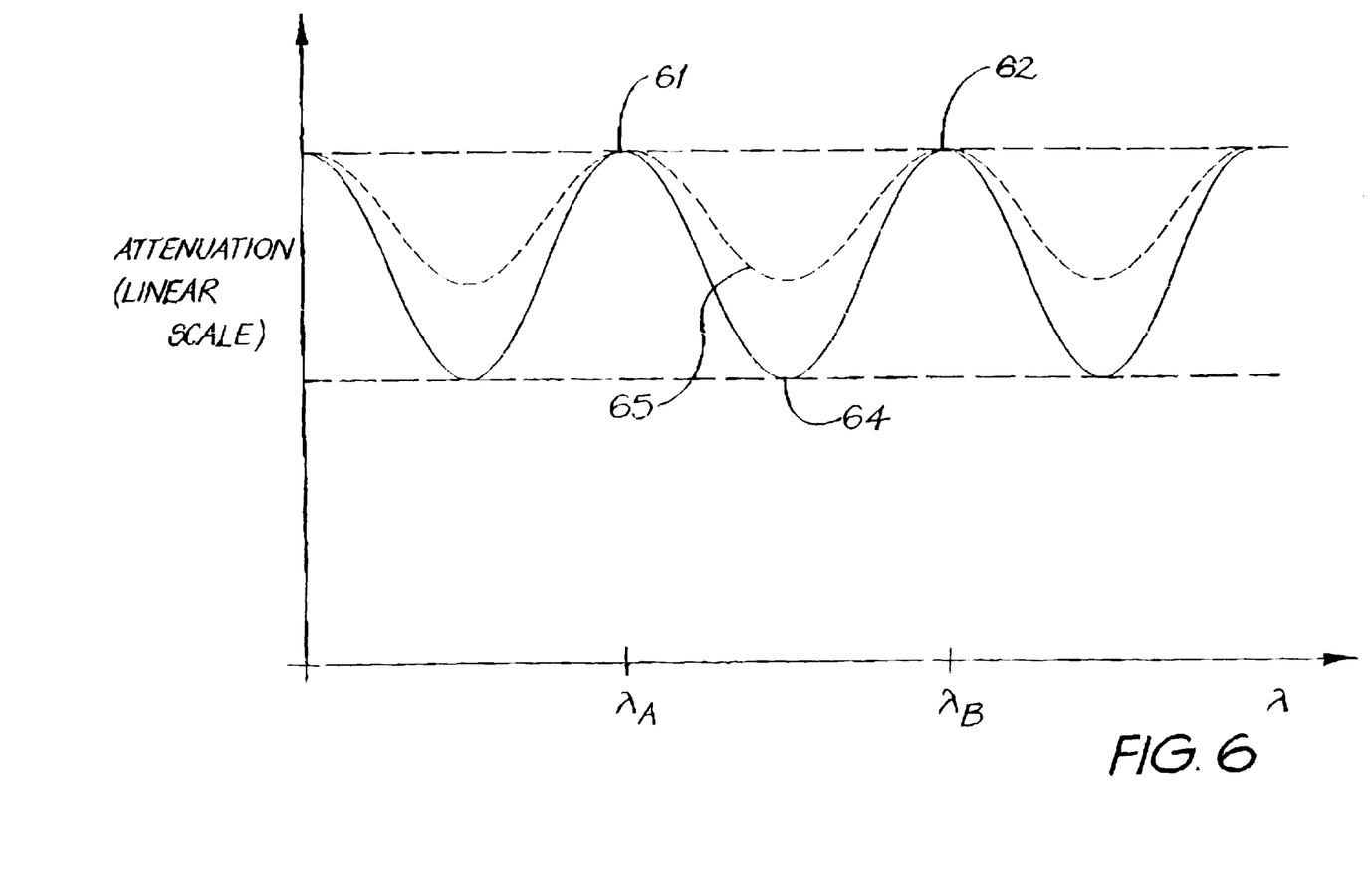
FIG. 6 illustrates the overall operation of the device of the preferred embodiment.

The net operational characteristics of the device will therefore be as illustrated in FIG. 6 which shows a graph of device attenuation with respect to wavelength. The position of the peaks eg. 61, 62 having wavelengths $\lambda_A$ and $\lambda_B$ (corresponding to $\lambda_{1/2}$ in the arrangement of FIG. 3) will be determined by the thickness and birefringence of the birefringent crystal. Hence, if a thermal electric cooler (otherwise known as a Peltier device) is attached to the birefringent crystal 8 so as to provide for controlled thermal expansion and birefringence, the position of the peak 61, 62 can be accurately controlled. Alternatively, a Pockel's cell device can be utilised which allows for the birefringence to be controlled by an electric field.

The degree of attenuation eg. 64, 65 is determined by the operation of the Faraday rotator 7. Upon a Faraday rotation of 45°, very low levels of attenuation are achieved. With the Faraday rotator off, higher levels, 64 of attenuation are achieved. The Faraday rotator can be placed in an external magnetic field with the degree of rotation being proportional to the strength of the magnetic field. Alternatively the direction of the magnetic field can be controlled. Hence, to control the degree of attenuation, the magnetic field is altered in accordance with requirements.

Although the arrangement of FIG. 1 illustrates the invention in its preferred form, a number of modifications or variations are possible. For example, the mirror 9 can be dispensed with and the devices 5–8 replicated "on the other side of the mirror" so as to provide for the same effect. However, such an arrangement is likely to be more costly due to the duplication of parts. Further, an additional half-way plate may be provided after the walkoff crystal 5 so as to align the polarisation states, for example, at the stage 22 of FIG. 2. This may provide for reduced polarisation mode dispersion at the cost of an extra parts and a different magnetic drive is required. Alternatively, a variable retardation plate can be utilised in place of the Faraday rotator.

Further, if the birefringent crystal 8 is dispensed with, the device acts as a variable attenuator under electronic control with the attenuation being non-wavelength specific.

Figure 7:
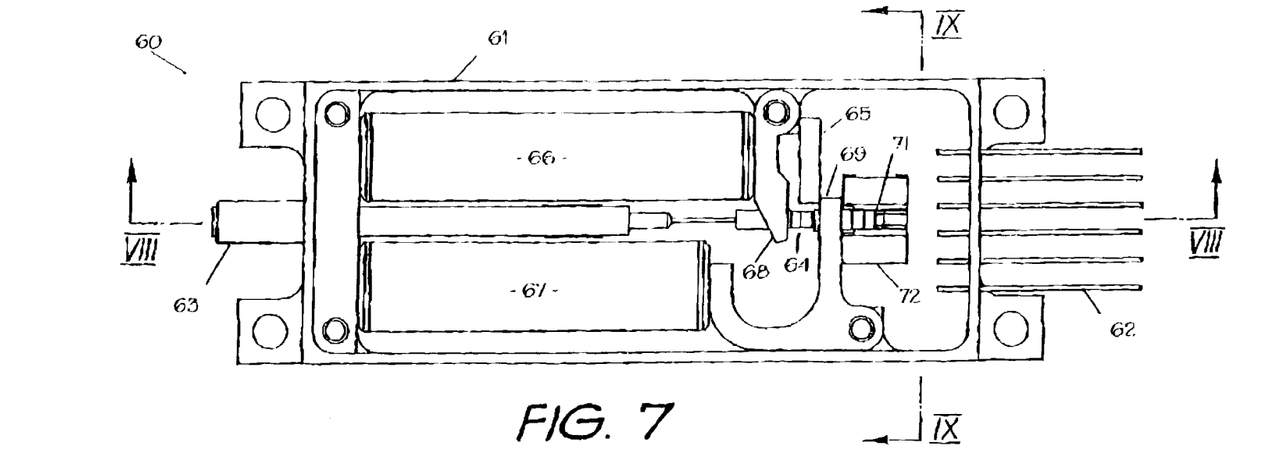
FIG. 7 illustrates a plan view of a device constructed in accordance with the teaching of the preferred embodiment.
Figures 8, 9:
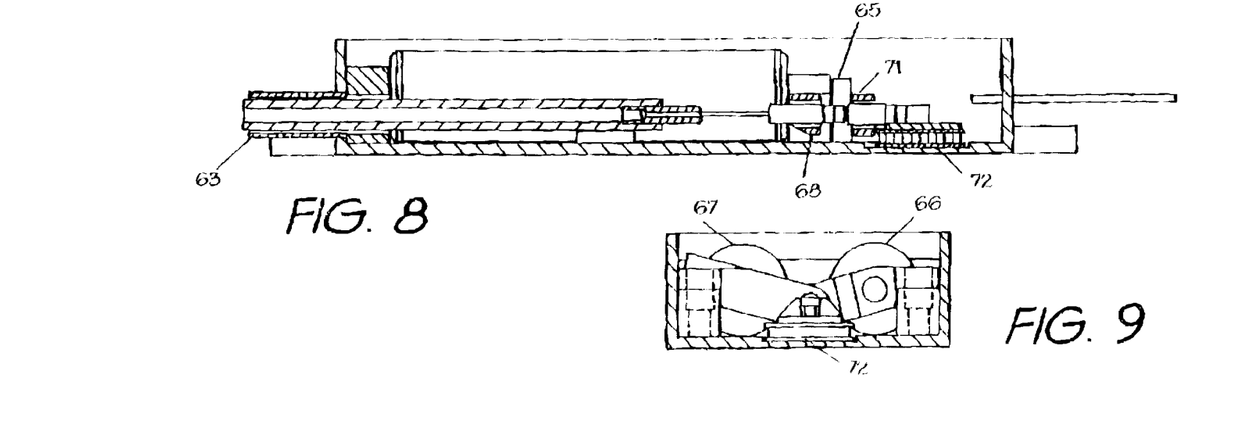
FIG. 8 illustrates a sectional view through the line VIII—VIII of FIG. 7.
FIG. 9 illustrates a sectional view through the line IX—IX of FIG. 7.

Turning now to FIG. 7 to FIG. 9, there is illustrated various views of one form of practical device constructed in accordance with the teachings of FIG. 1. The device 60 is formed within an aluminium case 61 having a series of cable feed through holes 62. The input and output fibre are fed though a tube 63 and are attached to a first stack 64 of optical components which includes the Faraday rotator which operates in a magnetic field created by permanent magnet 65 and electromagnets 66,67 which have pole pieces 68, 69. The birefringent element 71 is mounted on Peltier cooler 72.

Ideally, the fibre passes through two apertures, one in each pole arms 68, 69. This provides for an extremely compact arrangement and allows for high strength magnetic fields to be used in the vicinity of the Faraday rotator 64.

Further, the arrangement 60 provides for low power operation. The permanent magnet can be set up to provide a magnetic field at approximately 20 to 30 degrees to the face of the faraday rotator. A positive and negative drive current can be used in the electromagnet to drive the filter from 0 dB to a maximum extinction value. The angled bias field is created by the attraction of the field to the pole piece and the field varies as a function of the position of the garnet. The vector addition of the electromagnetic field and the permanent bias field allows for Faraday rotation angles from zero to a maximum value.

It will therefore be evident that the preferred embodiment comprises a tunable filter which can be electronically controlled to provide tunable extinction and an overall level of extinction. Further, the filter is polarisation independent, compact and utilises a low number of components due its reflective nature and hence can be constructed at a low cost.

Figure 10:
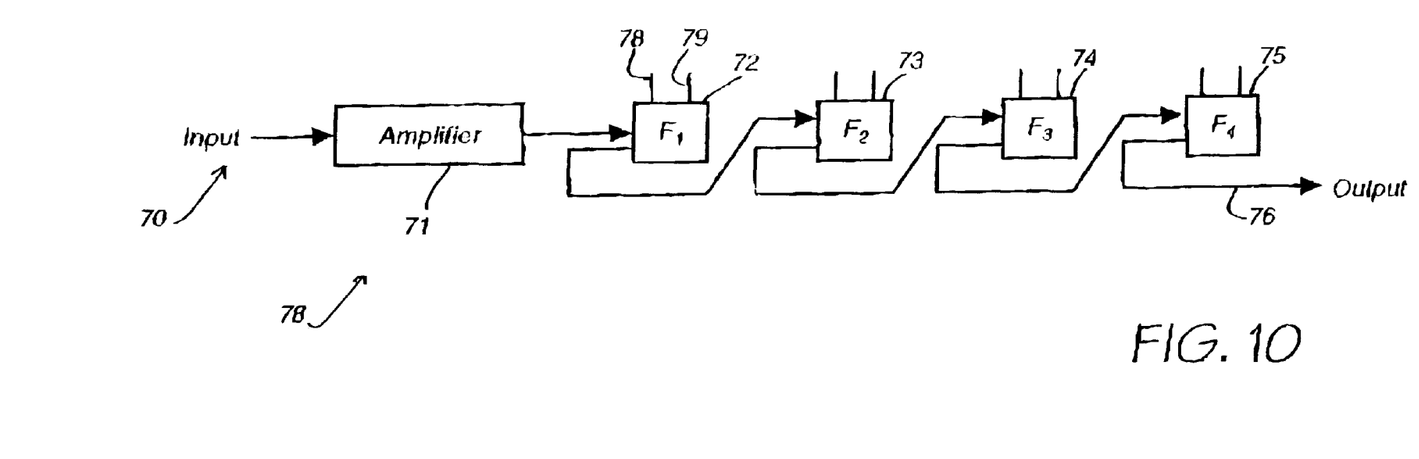
FIG. 10 illustrates schematically the incorporation of the preferred embodiment into a optical amplifier device.

The preferred embodiment has a number of uses in optical arrangements. For example, by cascading several units with each providing differing tuned filter characteristics, it is possible to construct a Fourier type series so as to provide for complex attenuation characteristics. Such an arrangement is illustrated in FIG. 10 wherein an input 70 is subjected to amplification 71 before being subjected to a series of tuned attenuation filters 72–75, each of which attenuates its input in a tuned manner. Eventually, the output 76 is transmitted to a next stage. The filters 72–75 attenuate their input in accordance with input control signals e.g. 78, 79 with one input being used to control the degree of Faraday rotation and the other input being used to control the birefringence.

Figure 11:
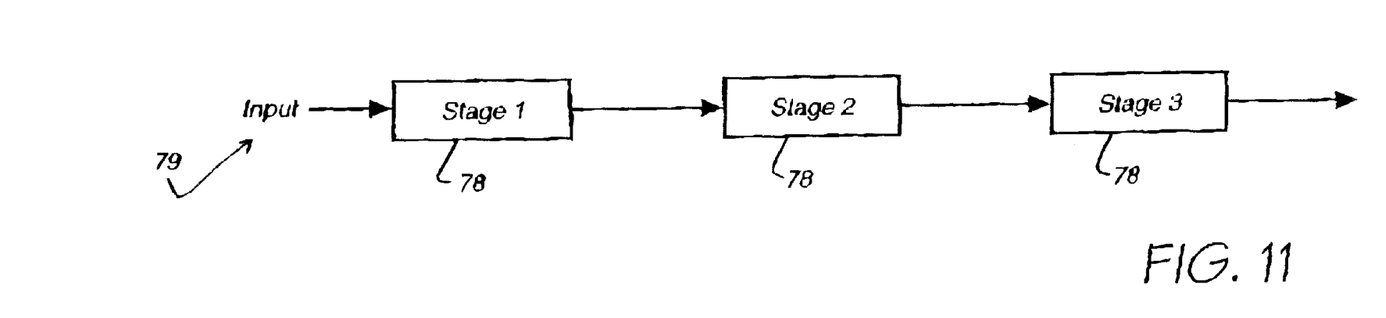
FIG. 11 illustrates schematically the incorporation of the preferred embodiment into a communications system.

The arrangement 78 of FIG. 10 can be used in multistage fibre transmission as shown in FIG. 11, with each stage 78 providing for tuned amplification and retransmission of an input signal 79.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. An optical filter for providing frequency dependant filtering of an optical input signal, said filter including the following components:
    an input wave guide;
    an output waveguide;
    a polarisation separation means for relatively spatially separating orthogonal polarisations of light transmitted therethrough;
    a variable polarisation rotation means for applying a variable polarisation manipulation to light transmitted therethrough, said variation being dependant on a first control input signal; and
    a birefringent element having a frequency variable birefringence to light transmitted therethrough, said variation being dependant on a second control input signal;
    wherein the components are disposed with respect to one another such that an optical input signal emitted from said input waveguide passes through said polarisation separation means, said variable polarisation rotation means and said birefringent element to said output waveguide so as to produce at said output waveguide an optical output signal having a frequency dependant output characteristic determined by one of said control input signals.

2. A filter as claimed in claim 1 wherein said frequency dependant output characteristic includes an overall extinction magnitude determined by said first control input signal.

3. A filter as claimed in claim 1 wherein the frequency dependant output characteristic includes a frequency varying attenuation determined by said second control signal.

4. A filter as claimed in claim 1 wherein said frequency dependant output characteristic includes an oscillatory frequency response having a tuning determined by said second control input signal.

5. A filter as claimed in claim 1 wherein said input and output waveguide have ends which are spaced apart at a first end of said filter and said filter further includes:
    a reflection element spaced at a second end of said filter such that said polarisation separation means, said variable polarisation rotation means and said birefringent element are between said reflection element and said waveguides, such that light emitted from said input waveguide passes through said polarisation separation means, said variable polarisation rotation means and said birefringent element before being reflected by said reflection element so as to again pass through said birefringent element, said variable polarisation rotation means and said polarisation separation means before being emitted towards said output waveguide.

6. A filter as claimed in claim 1 further including at least one focussing means focussing light emitted from said input waveguide towards said output waveguide.

7. A filter as claimed in claim 1 wherein the maximum level of attenuation of light passing from said input waveguide to said output waveguide at any particular frequency is determined by variation of said first control input signal, and wherein the frequency of the maximum level of attenuation is determined by variation of said second control input signal.

8. A filter as claimed in claim 1 wherein said variable birefringence is provided by thermal variation of said birefringent element in proportion with the level of said second control input signal.

9. A filter as claimed in claim 8 wherein said thermal variation is provided by a Peltier device attached to said birefringent element.

10. A filter as claimed in claim 1 wherein said variable birefringence is provided by an electro-optic element.

11. An optical attenuation filter including the following components:
    an input and an output wave guide having ends spaced apart at a first end of said filter;
    a polarisation separation means for spatially separating polarisation states emitted from said input waveguide by translating substantially orthogonal input polarisations in a substantially orthogonal direction;
    a variable polarisation rotation means for applying a variable polarisation manipulation to light transmitted therethrough, said variation being dependant on a first control input signal; and
    reflection means for reflecting light emitted from said input waveguide towards said output waveguide;
    wherein said components are disposed with respect to one another such that an optical input signal emitted from said input waveguide passes through said polarisation separation means, said variable polarisation rotation means, is reflected by said reflection means back through said variable polarisation means and said polarisation separation means toward said output waveguide so as to produce at said output waveguide an optical output signal having a polarisation independent extinction determined by the first control input signal.

12. A filter as claimed in claim 11 wherein said variable polarisation rotation means comprises a Faraday rotator providing a rotation in accordance with an applied magnetic field and said filter is formed between the poles of an electromagnet with one of said poles including an aperture through which said input and output waveguide passes.

13. A filter as claimed in claim 12 wherein said external magnetic field is provided by an initial permanent magnet providing a magnetic field having tangential and perpendicular components to a face of the Faraday rotator, and a second electromagnet having a magnetic field substantially perpendicular to the face of the Faraday rotator.

14. An optical filter including a variable polarisation rotation means comprising a Faraday rotator providing a rotation in accordance with an applied magnetic field and said filter is formed between the poles of an electromagnet with one of said poles including an aperture through which said input and output waveguide passes.

15. A filter as claimed in claim 14 wherein said external magnetic field is provided by an initial permanent magnet providing a magnetic field having tangential and perpendicular components to a face of the Faraday rotator, and a second electromagnet having a magnetic field substantially perpendicular to the face of the Faraday rotator.

16. A method of filtering an optical input signal in a frequency dependant manner, said method comprising the steps of:
(a) spatially separating substantially orthogonal polarisation states of the optical input signal;
(b) imparting a wavelength dependant polarisation variation to at least one of said polarisation states of the optical input signal to produce outputs and:
(c) combining the outputs of said step (b) to produce a substantially polarisation independent, frequency dependant filter response.

17. A method as claimed in claim 16 wherein said step (a) comprises spatially separating orthogonal polarisation states.

18. A method of filtering an optical input signal in a frequency dependant manner said method comprising the steps of:
(a) emitting said light from a first optical waveguide;
(b) substantially separating orthogonal polarisation states emitted from said first optical waveguide;
(c) rotating said separated orthogonal polarisation states in a first direction;
(d) for polarisation states having a predetermined angular profile, delaying one orthogonal polarisation state relative to a second so as to produce optical frequency dependant polarisation states;
(e) rotating said delayed polarisation states in a second direction to produce rotated delayed polarisation states; and
(f) for predetermined angular profiles, translating one polarisation state with respect to a second so as to combine said polarisation states having predetermined angular profiles at an output waveguide;
wherein light emitted from said input optical waveguide is attenuated in a frequency dependant manner.

19. A method as claimed in claim 18 wherein said step (c) comprises rotating said polarisation states to a degree as determined by a first input control signal.

20. A method as claimed in claim 18 wherein said step (d) comprises delaying one orthogonal polarisation state relative to a second by an amount as determined by a second input control signal.

21. A method as claimed in claim 18 wherein the frequency dependant filtering characteristics are determined by said first and second input signal.

22. A method as claimed in claim 18, further comprising the step of focussing light emitted from said first optical waveguide.

23. An optical amplifier including an amplifying element and an optical equaliser comprising a plurality of concatenated optical filter elements each having frequency dependant attenuation characteristics which can be dynamically frequency and overall attenuation tuned in order to optimise the optical equalisation of an optical signal transmitted by said optical amplifier, at least one of said optical filter elements including an input wave guide; an output waveguide; a polarisation separation means; a variable polarisation rotation means, said variation being dependant on a first control input signal; and a birefringent element having variable birefringence, said variation being dependant on a second control input signal; wherein an optical input signal emitted from said input waveguide passes through said polarisation separation means, said variable polarisation rotation means and said birefringent element to said output waveguide so as to produce at said output waveguide an optical output signal having a frequency dependant output characteristic determined by one of said control input signals.

24. An optical communications system including an optical element further including an amplifying element and an optical equaliser comprising a plurality of concatenated optical filter elements each having frequency dependant attenuation characteristics which can be dynamically frequency and overall attenuation tuned in order to optimise the optical equalisation of an optical signal transmitted by said optical element, at least one of said optical elements including an input wave guide; an output waveguide; a polarisation separation means; a variable polarisation rotation means, said variation being dependant on a first control input signal; and a birefringent element having variable birefringence, said variation being dependant on a second control input signal; wherein an optical input signal emitted from said input waveguide passes through said polarisation separation means, said variable polarisation rotation means and said birefringent element to said output waveguide so as to produce at said output waveguide an optical output signal having a frequency dependant output characteristics determined by one of said control input signals.

* * * * *